US012752799B2

(12) United States Patent
Hammerschmidt et al.

(10) Patent No.: US 12,752,799 B2
(45) Date of Patent: Oct. 6, 2026

(54) DRIVING SAFETY SYSTEM WITH SAFE TRANSMISSION CHANNEL

(71) Applicant: Infineon Technologies AG, Neubiberg (DE)

(72) Inventors: Dirk Hammerschmidt, Finkenstein (AT); Sigmund Zaruba, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/952,507

(22) Filed: Nov. 19, 2024

(65) Prior Publication Data

US 2025/0162596 A1 May 22, 2025

(30) Foreign Application Priority Data

Nov. 21, 2023 (DE) ........................ 102023211587.5

(51) Int. Cl.
*B60W 50/00* (2006.01)
*B60W 10/184* (2012.01)
*B60W 10/30* (2006.01)

(52) U.S. Cl.
CPC ...... *B60W 50/0098* (2013.01); *B60W 10/184* (2013.01); *B60W 10/30* (2013.01); *B60W 2050/0043* (2013.01); *B60W 2520/28* (2013.01)

(58) Field of Classification Search
CPC .. B60W 50/04; B60W 10/30; B60W 50/0098; B60W 10/184
See application file for complete search history.

(56) References Cited

U.S. PATENT DOCUMENTS

| | | | | |
|---|---|---|---|---|
| 2016/0375732 | A1* | 12/2016 | Lazar | B60C 23/0481 73/115.08 |
| 2018/0375881 | A1* | 12/2018 | Wada | H04W 4/48 |
| 2019/0141070 | A1* | 5/2019 | Tsurumi | B60R 16/0232 |
| 2020/0198572 | A1* | 6/2020 | Kim | G08G 1/166 |
| 2021/0370943 | A1 | 12/2021 | Jung | |
| 2022/0348227 | A1* | 11/2022 | Foster | B60Q 1/507 |
| 2023/0266759 | A1 | 8/2023 | Han et al. | |

FOREIGN PATENT DOCUMENTS

| | | | |
|---|---|---|---|
| DE | 102006036066 | A1 | 4/2007 |
| DE | 102008008237 | A1 | 8/2009 |
| DE | 102009042799 | A1 | 3/2011 |
| DE | 102007059785 | B4 | 12/2011 |
| KR | 20220134224 | A | 10/2022 |
| WO | 2019111459 | A1 | 6/2019 |
| WO | 2022150196 | A1 | 7/2022 |

* cited by examiner

*Primary Examiner* — Long T Tran
(74) *Attorney, Agent, or Firm* — Harrity & Harrity, LLP

(57) ABSTRACT

A driving safety system for a motor vehicle with at least one wheel speed sensor is disclosed, which is configured to determine the actual wheel speed on a wheel, and a driving safety control unit configured to receive a wheel speed signal generated by the wheel speed sensor, where the wheel speed signal represents a determined actual wheel speed. The wheel speed signal is transmitted via an unprotected transmission channel between the wheel speed sensor and the driving safety control unit. The driving safety control unit is configured to receive a travel signal that correlates with the actual vehicle speed and to compare the travel signal with the wheel speed signal to check the wheel speed signal for plausibility. The movement signal is transmitted to the driving safety control unit via a safe transmission channel.

20 Claims, 11 Drawing Sheets

DRIVING SAFETY SYSTEM WITH SAFE TRANSMISSION CHANNEL

CROSS-REFERENCE TO RELATED APPLICATION

This application claims priority to Germany Patent Application No. 102023211587.5 filed on Nov. 21, 2023, the content of which is incorporated by reference herein in its entirety.

TECHNICAL FIELD

The innovative concept described herein concerns a vehicle safety system, such as ABS (anti-lock braking system), ASR (anti-skid control) and ESP (Electronic Stability Program), whereby a signal indicating the wheel speed, speed or acceleration of the vehicle is transmitted to the associated control unit via a safe transmission channel.

BACKGROUND

The above-mentioned driving safety systems, such as ABS, ASR and ESP, are now fitted as standard in almost every modern motor vehicle and are sometimes even legally prescribed. Known driving safety systems use the wheel speed signal from corresponding wheel speed sensors, which are arranged in the immediate vicinity of a wheel. For this purpose, incremental gears or magnetic encoder or pole wheels can be mounted on the wheel axle, which rotate along with the wheel axle or wheels. The respective wheel speed sensor measures the wheel speed using the incremental or polar wheel and transmits this wheel speed signal to one or more control units, such as the ABS or ESP control unit.

The wheel speed sensors are usually simple inductive or magneto-resistive sensors that transmit the detected speed signal to the respective control unit via a conventional two-wire line. This form of wheel speed sensors is very cost-effective, which predestines them for use in mass-production vehicle construction. In addition, these sensors have very low latency, which is particularly important in driving safety systems such as ABS, ESP or ASR.

With the increasing electrification of today's vehicles, the recorded wheel speed signal can also be used for other purposes. For example, the actual speed of the vehicle can be determined based on the recorded wheel speed, which in turn can be used to implement electronically implemented speed interlocks or to determine the mileage.

Due to the aforementioned simple design of the wheel speed sensors, as well as the use of unsecured standard transmission protocols, conventional wheel speed sensors are an easy target of, usually criminally driven, manipulations. In this case, the data traffic between the wheel speed sensors and the respective control unit is intercepted or manipulated with so-called MAN in the middle attacks. With manipulation of the wheel speed signal, for example, an electronically implemented speed lockout can be bypassed or the actual mileage reduced. In particularly serious situations, the driving safety systems (e.g., ABS, ESP, ASR) or a speed-dependent drive-by-wire steering can be disturbed or selectively deactivated, which can lead to the uncontrollability of the vehicle and thus to massive accidents.

For this reason, the ISO 21434 standard has been developed, which deals with cyber security in vehicles. However, the ISO 21434 standard does not provide a solution to the above-mentioned problem of MAN in the Middle attacks on standardized wheel speed sensors.

SUMMARY

It is therefore the aim of the innovative concept described herein to provide a driving safety system for a motor vehicle that solves the above-mentioned problems.

This objective is achieved by a driving safety system according to claim 1 and by a corresponding method according to claim 15.

The innovative driving safety system has at least one wheel speed sensor, which is configured to determine the actual wheel speed on a wheel. In addition, the driving safety system includes a driving safety control unit which is configured to receive a wheel speed signal generated by the wheel speed sensor, wherein the wheel speed signal represents a determined actual wheel speed. The wheel speed signal is initially transmitted via an unprotected transmission channel between the wheel speed sensor and the driving safety control unit. However, in line with the innovation, the driving safety control unit is configured to receive a locomotion signal that correlates with the vehicle's current actual speed and to compare the locomotion signal with the wheel speed signal in order to check the wheel speed signal for plausibility. The movement signal is transmitted to the driving safety control unit via a safe transmission channel.

Furthermore, a method for plausibility testing of a wheel speed signal received by a wheel speed sensor via an unsafe transmission channel in a driving safety system for a motor vehicle is proposed. The method includes, among other things, receiving the wheel speed signal from the wheel speed sensor, wherein the wheel speed signal represents the determined actual wheel speed, and wherein the wheel speed signal is transmitted via an unsecured transmission channel. In line with the innovation, an additional locomotion signal is received, which indicates the current actual speed of the vehicle, whereby the locomotion signal is transmitted via a safe transmission channel. The wheel speed signal received via the unsafe transmission channel is then compared with the transport signal transmitted via the safe transmission channel in order to check the wheel speed signal for plausibility.

Further implementations and advantageous aspects of the position determination system and of the corresponding method are specified in the respective dependent patent claims.

BRIEF DESCRIPTION OF THE DRAWINGS

A few example implementations are illustrated by way of example in the drawing and explained below. In the figures.

DETAILED DESCRIPTION

Example implementations are described in more detail hereinbelow with reference to the figures, with elements that have the same or similar function being provided with the same reference signs.

Method steps depicted or described within the scope of the present disclosure may also be carried out in a sequence that differs from the depicted or described one. Moreover, method steps that relate to a particular feature of a device are able to be exchanged with this feature of the device, this also applying the other way round.

In the implementations described herein, it is shown purely schematically that a wheel speed sensor is arranged at each individual wheel of a vehicle. However, this is not to be understood as limiting. The innovative concept presented here generally works with a single wheel speed sensor mounted on a single wheel of a vehicle.

Figure 1:
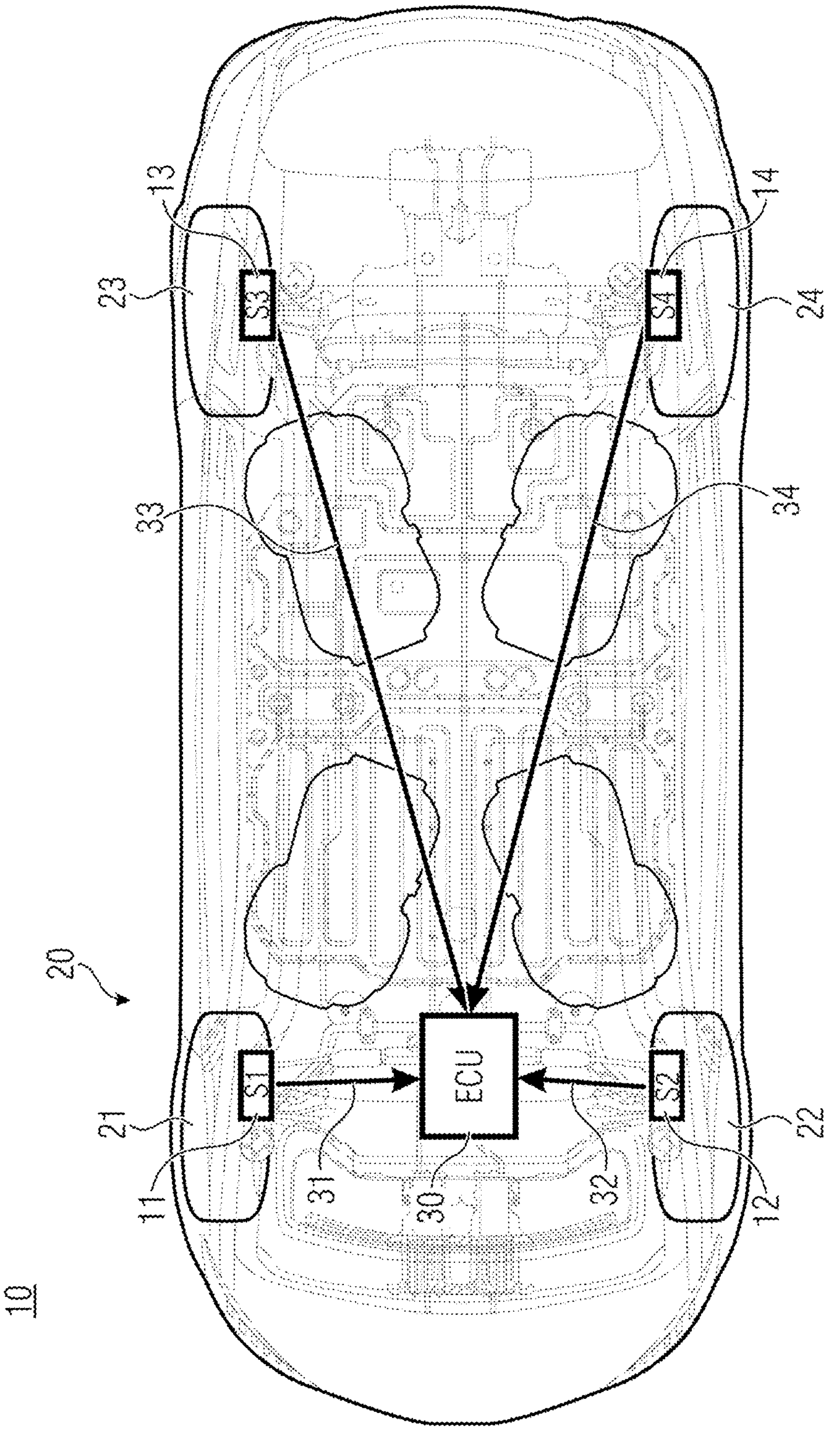
FIG. 1 illustrates a schematic semi-transparent top view of a vehicle with a conventional driving safety system according to an example.

FIG. 1 shows first for introduction a schematic partially transparent top view of a vehicle 20, which is equipped with a conventional driving safety system 10. For example, the driving safety system 10 can be a conventional ABS, ESP or ASR system.

The driving safety system 10 has four wheel speed sensors 11, 12, 13, 14, which are also marked S1, . . . , S4. In each case, a sensor 11, 12, 13, 14 is assigned exactly to a wheel 21, 22, 23, 24.

Each wheel speed sensor 11, 12, 13, 14 is each connected to a control unit 30 via an unfused physical signal line 31, 32, 33, 34, for example using a simple two-wire line. Control unit 30 is also referred to as the Electronic Control Unit (ECU). The wheel speed sensors 11, 12, 13, 14 can communicate with the control unit 30 via these signal lines 31, 32, 33, 34 and transmit their respectively detected speed signals to the control unit 30.

The transmission is typically via a pulse interface. This is continuous in value and continuous in time, since the actual information lies in the time between two successive pulses, but two or three discrete current levels are used. In addition, the transmission of additional information, such as the direction of rotation, is digital in the case of an AK protocol, and discreetly in the case of a PWM protocol in the form of different pulse lengths.

As mentioned above, signal lines 31, 32, 33, 34 are unprotected transmission channels. This means that the wheel speed data acquired by the respective speed sensors 11, 12, 13, 14 are transmitted in the form of analog and/or digital signals to the control unit 30 in an unsecured manner. This unsafe transmission channel makes the entire driving safety system 10 vulnerable to unauthorized cyber security attacks, as discussed in the introduction to the description of this publication.

For example, the signal lines 31, 32, 33, 34 can be tapped or interrupted so that the unsecured communication between the wheel speed sensors 11, 12, 13, 14 and the control unit 30 can be intercepted or manipulated. This form of cyber attack is also known as Man in the Middle attack. Such a man in the middle attack can be realized with conventional wheel speed sensors 11, 12, 13, 14 already by simply disconnecting the physical signal lines 31, 32, 33, 34. As this can be used to manipulate safety-related systems, there is therefore an increased safety risk.

Figure 2:
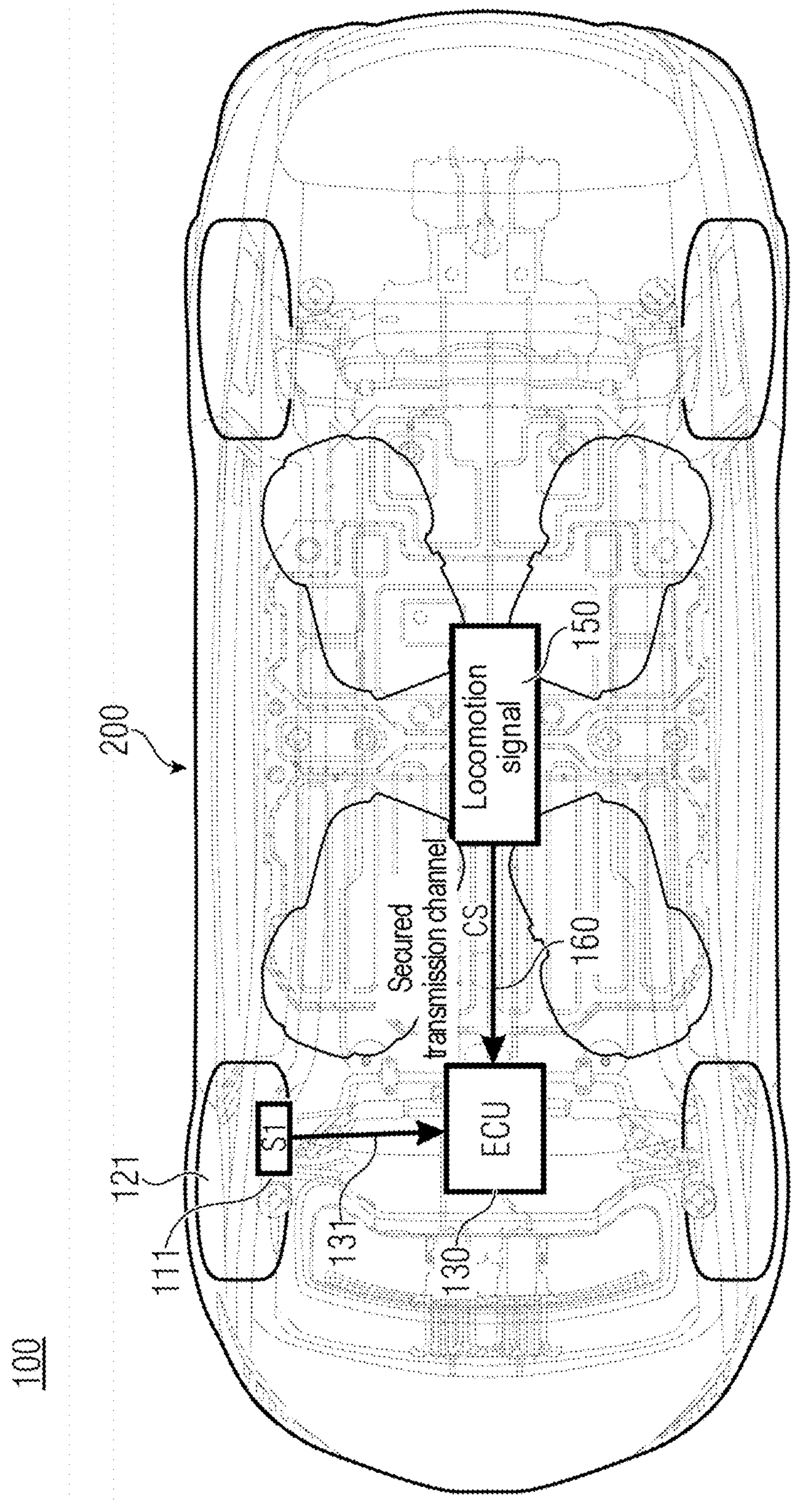
FIG. 2 illustrates a schematic semi-transparent top view of a vehicle with a driving safety system according to an implementation.

FIG. 2 shows an implementation of an innovative driving safety system 100 with which the aforementioned cybersecurity problems can be solved. The driving safety system 100 can be installed in any motor vehicle 200, e.g., in a passenger car (car) or a truck (truck), but also in a two-wheeled vehicle. Within the scope of the present disclosure, the innovative driving safety system 100 is discussed using the non-limiting example of a passenger car 200.

The driving safety system 100 has at least one wheel speed sensor 111, which is also shown here with the symbol S1. The wheel speed sensor 111 is configured to determine the actual wheel speed on a wheel 121. This can be a driven wheel or a non-driven wheel.

The driving safety system 100 also comprises a driving safety control unit 130, which is configured to receive a wheel speed signal generated by the wheel speed sensor 111, wherein the wheel speed signal represents a determined actual wheel speed.

In this case, the wheel speed signal, as previously usual, can be transmitted via an unprotected transmission channel 131 between the wheel speed sensor 111 and the driving safety control unit 130.

According to the innovation, the driving safety control unit 130 is configured to receive a movement signal 150 independent of the wheel speed signal or the wheel speed sensor 111, this movement signal 150 correlates with the current actual speed of the vehicle 200. The locomotion signal 150 may be present, for example, in the form of a speed signal, a speed signal or an acceleration signal.

In accordance with the innovative concept disclosed herein, the transport signal 150 is transmitted to the driving safety control unit 130 via a safe transmission channel 160. A secure transmission channel is characterized, among other things, by the fact that measures have been taken to secure the data transmitted via this method against unauthorized access from outside, such as cyber attacks. Therefore, secure transmission channel 160 is also referred to here with the CS symbol—for cyber security.

According to the innovation, the driving safety control unit 130 is configured to compare the transport signal 150 received via the safe transmission channel 160 with the wheel speed signal received via the unsafe transmission channel 131 in order to check the wheel speed signal for plausibility.

The plausibility check can be used to perform a setpoint-actual value comparison. This means that the transport signal 150 transmitted via the safe transmission channel 160 can represent a setpoint, such as a setpoint speed, a setpoint speed or a setpoint acceleration, and the speed signal transmitted by the wheel speed sensor 111 via the unsafe transmission channel 131 can represent an actual value.

The pulsed wheel speed signal generated by the wheel speed sensor 111 can, moreover, be transformed as desired into a speed signal or an acceleration signal, as well as transformed back, using appropriate conversion instructions. The time between two successive pulses corresponds to a certain distance travelled by the rotating wheel. Thus, for example, the velocity is calculated as the ratio of the distance by the time between the two successive pulses.

Thus, if the transport signal 150 transmitted via the safe transmission channel 160 in the form of a speed signal is present, the innovative driving safety control unit 130 may be configured, for example, to compare the movement signal 150 with the actual wheel speed signal transmitted by the wheel speed sensor 111.

If, on the other hand, the transport signal 150 transmitted via the safe transmission channel 160 is present in the form of a speed signal, the innovative driving safety control unit 130 may be configured, for example, to convert the actual wheel speed signal transmitted by the wheel speed sensor 111 into a speed signal and to compare this with the transport signal 150.

If the travel signal 150 transmitted via the safe transmission channel 160 is present in the form of an acceleration signal, then the innovative driving safety control unit 130 may be configured to convert the actual wheel speed signal transmitted by the wheel speed sensor 111 into an acceleration signal and compare this with the travel signal 150.

According to the innovation, the driving safety control unit 130 can be configured to compare the wheel speed signal received via the unsafe transmission channel 131 with the transport signal 150 received via the safe transmission channel 160 for the purpose of plausibility testing. If the driving safety control unit 130 detects a deviation, it can generate an error message. Alternatively or in addition, the driving safety computer 130 can initiate a specific action. For example, if, as explained above, the wheel speed is manipulated in such a way that the maximum speed limit (e.g., Vmax<=250 km/h) is bypassed, the driving safety control unit 130 can limit the maximum speed of the vehicle, e.g., based on the travel signal.

In the following, several non-limiting implementations are described to illustrate how the locomotion signal 150 can be obtained, and which safe transmission channels 160 can be used for this purpose. According to the innovation, the secure transmission channel 160 may, for example, include an authentication method for the transmitted locomotion signal 150. Alternatively or additionally, the secure transmission channel 160 may include an encryption of the transmitted locomotion signal 150. In addition, the secure transmission channel 160 can meet the requirements of the ISO/SAE 21434 standard for cyber security in vehicles.

Figure 3:
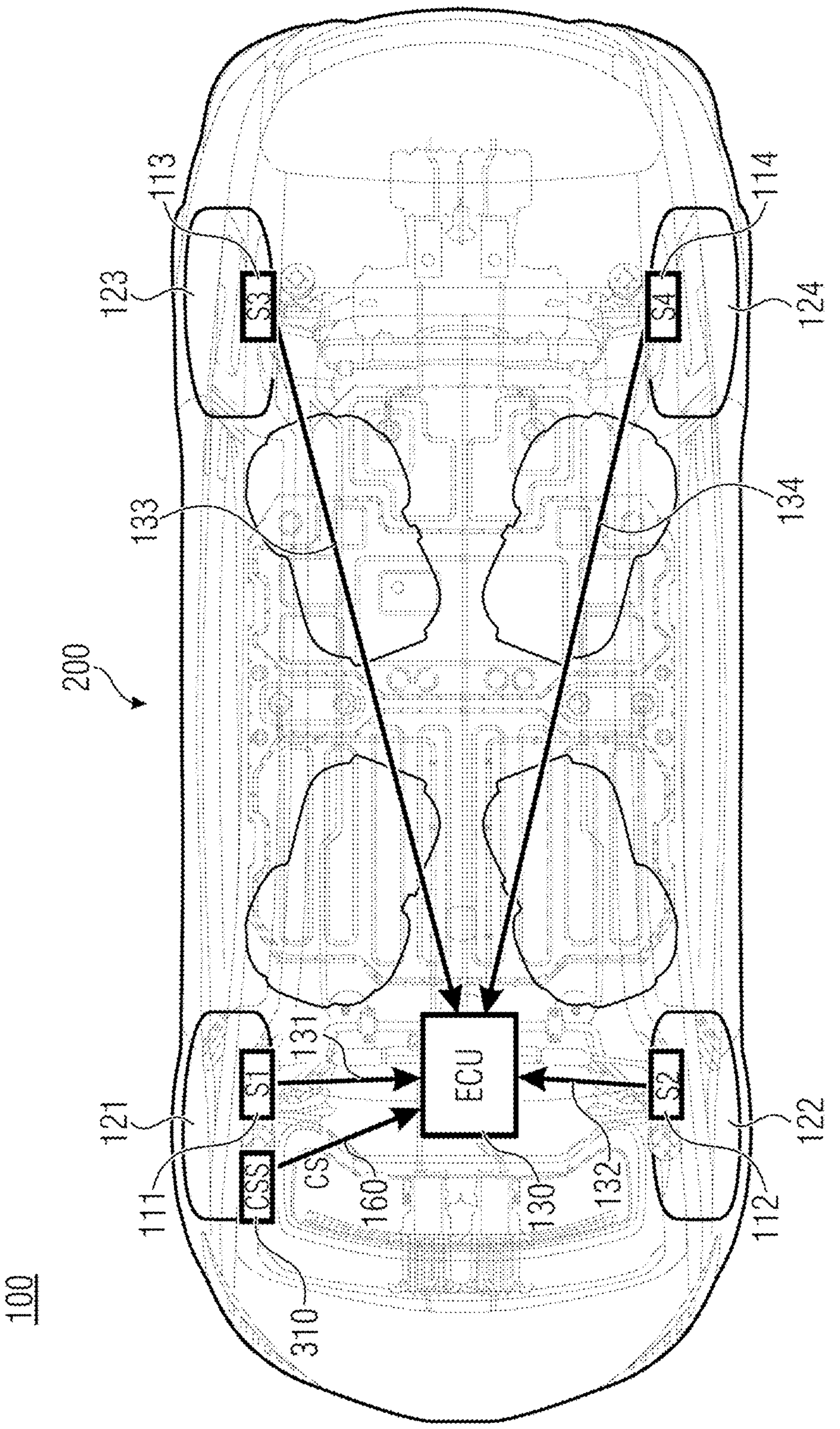
FIG. 3 illustrates a schematic semi-transparent top view of a vehicle with a driving safety system according to a further implementation.

FIG. 3 shows an implementation of an innovative driving safety system 100. The driving safety system 100 114 can have a conventional wheel speed sensor 111, 124, 122, 123 on each wheel 121, 113, 112 of the vehicle 200. The conventional wheel speed sensors 111, 112, 113, 114 can be ABS sensors fitted as standard, for example. However, as mentioned earlier, this is purely optional. The innovative concept presented here also works in principle with a single wheel speed sensor arranged on a single wheel.

The conventional wheel speed sensors 111, 112, 113, 114 are each connected to the driving safety control unit 130 via an unsafe transmission channel 131, 132, 133, 134, such as a conventional two-wire line.

In the implementation shown here, the driving safety system 100 has an additional sensor 310, which is configured to generate the aforementioned locomotion signal. The additional "safe" sensor 310 may, for example, be a wheel speed sensor which is arranged on one of the wheels 121, 122, 123, 124 of the vehicle 200. In this case, the movement signal may be in the form of a wheel speed signal.

The additional sensor 310 is connected to the driving safety control unit 130 via a safe transmission channel 160. This is why secure transmission channel 160 is again marked with the abbreviation CS—for cyber security.

The movement signal transmitted from the additional sensor 310 to the driving safety control unit 130 is transmitted via the safe transmission channel 160. Accordingly, the transmitted locomotion signal is a "safe" locomotion signal. For easier differentiation, the additional sensor 310 is also referred to herein as a "safe" sensor and is accordingly marked with CSS—for cyber security sensor.

The conventional wheel speed sensors 111, 112, 113, 114, on the other hand, transmit their respective wheel speed signal via an unsafe transmission channel 131, 132, 133, 134. They are therefore also referred to as "unsafe" wheel speed sensors, and the wheel speed signals they generate are also referred to as "unsafe" wheel speed signals.

According to the implementation shown in FIG. 3, the additional "safe" wheel speed sensor 310 111 may be present in addition to an already existing wheel 121 of the motor vehicle 200, and in addition to the already existing wheel speed sensor 111 also detect the wheel speed of that same wheel 121.

The driving safety control unit 130 may be configured to receive the locomotion signal generated by the additional wheel speed sensor 310 in the form of a "safe" wheel speed signal via the safe transmission channel 160.

According to the innovative concept presented herein, a "unsafe" wheel speed signal received from one of the conventional wheel speed sensors 111, 112, 113, 114 can now be checked for plausibility using the "safe" wheel speed signal. The driving safety control unit 130 receives the "safe" movement signal via the safe transmission channel 160 directly from the additional "safe" wheel speed sensor 310.

Advantageously, the "safe" wheel speed sensor 310 may have a lower update rate requirement. In addition, a certain amount of latency, which can result from the algorithms used to achieve channel safety, plays a negligible role, since the plausibility check, unlike the driving safety applications (ABS, ESP, ASR), is not time-critical.

Figure 4:
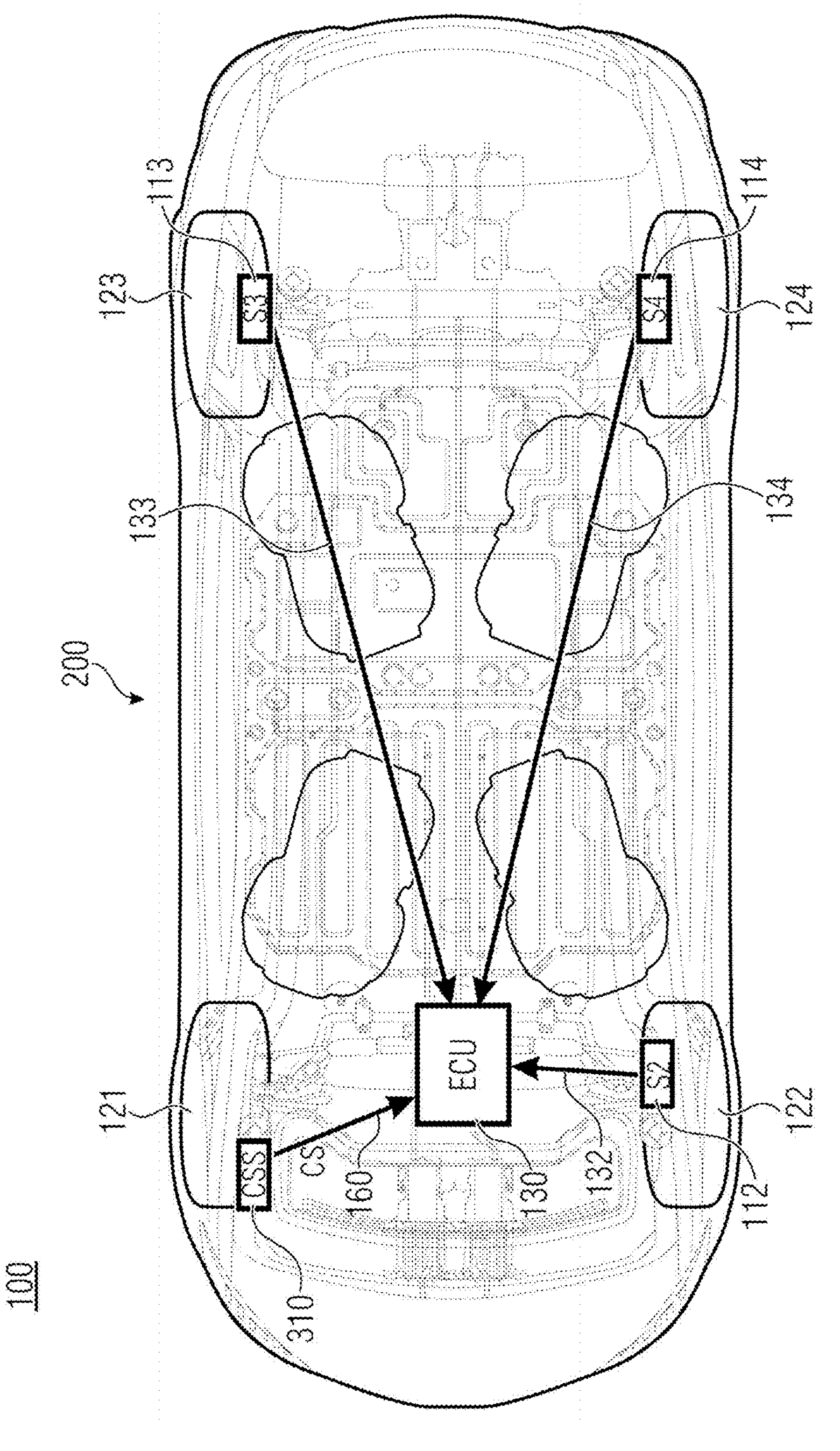
FIG. 4 illustrates a schematic semi-transparent top view of a vehicle with a driving safety system according to a further implementation.

FIG. 4 shows a further example implementation of an innovative analog stick 100. In comparison to the implementation discussed previously with reference to FIG. 3, one of the conventional "unsafe" wheel speed sensors 111, 112, 113, 114 was replaced by a "safe" wheel speed sensor 310 in this driving safety system 100. This offers the advantage that one of the conventional "unsafe" wheel speed sensors 111, 112, 113, 114 can be omitted, which results in cost savings. However, in comparison to the above-mentioned example, the latency is not negligible here, since the "safe" wheel speed sensor 310 now also assumes safety-critical driving safety tasks (ABS, ESP, ASR).

In FIG. 4, a four-circle brake control system is drawn in purely example form, in which a wheel speed sensor is present at all four wheels 121, 122, 123, 124 of the vehicle 200. However, a dual-circuit brake control system would also be conceivable, e.g., in the case of a two-wheel, in which only two wheels each would be arranged with a wheel speed sensor.

According to the innovation, the driving safety control unit 130 can therefore be part of a two-circuit or four-circuit brake control system with two or four wheel speed sensors 111, 113, 114, 114, wherein the innovative additional "safe"

wheel speed sensor 310 replaces one of the two or four "unsafe" wheel speed sensors 111, 112, 112, 113.

According to the innovative concept presented herein, a "unsafe" wheel speed signal received from one of the conventional wheel speed sensors 111, 112, 113, 114 can now be checked for plausibility using the "safe" wheel speed signal. The driving safety control unit 130 receives the "safe" movement signal via the safe transmission channel 160 directly from the additional "safe" wheel speed sensor 310.

Figure 5:
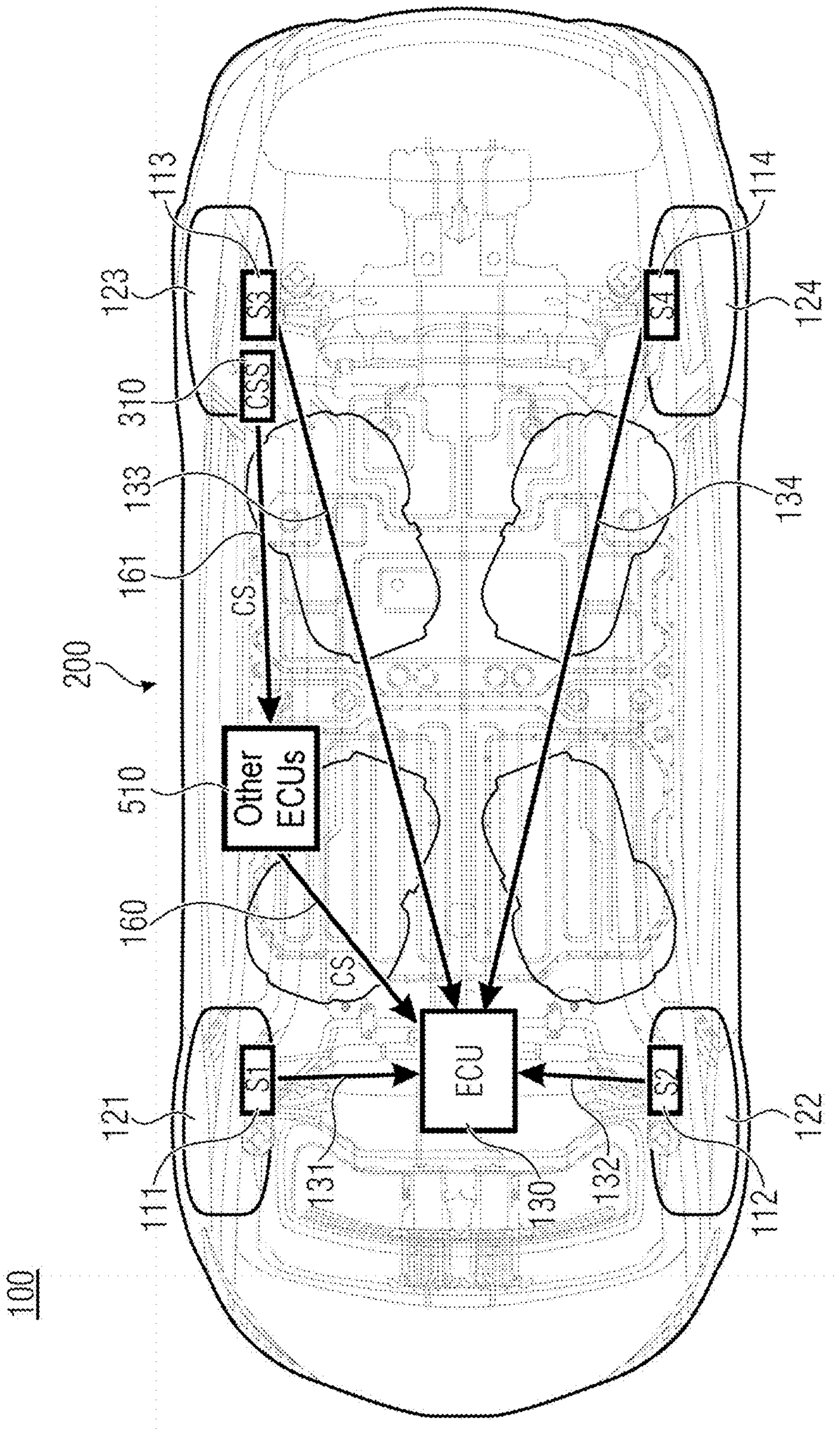
FIG. 5 illustrates a schematic semi-transparent top view of a vehicle with a driving safety system according to a further implementation.

FIG. 5 shows a further example implementation of an innovative analog stick 100. Here, the driving safety control unit 130 is configured to communicate with at least a second control unit 510 installed in the motor vehicle 200 via the safe transmission channel 160. In the case of the safe transmission channel 160, it can be, for example, a bus system installed in the vehicle, such as CAN, Ethernet, FlexRay and the like.

The second control unit 510 may also be configured to receive a wheel speed signal from the additional wheel speed sensor 310 via a different second safe transmission channel 161 and to forward the movement signal in the form of this wheel speed signal via the safe transmission channel 160 to the driving safety control unit 130.

Instead of the additional "safe" wheel speed sensor 310 shown in FIG. 5, the additional "safe" wheel speed sensor 310 can also replace one of the existing conventional "unsafe" wheel speed sensors 111, 112, 113, 114, as previously explained with reference to FIG. 4.

According to the innovative concept presented herein, a "unsafe" wheel speed signal received from one of the conventional wheel speed sensors 111, 112, 113, 114 can now be checked for plausibility using the "safe" wheel speed signal. The driving safety control unit 130 receives the "safe" travel signal via the safe transmission channel 160 from the second control unit 510, which in turn receives the "safe" travel signal via a second safe transmission channel 161 directly from the additional "safe" wheel speed sensor 310.

Figure 6:
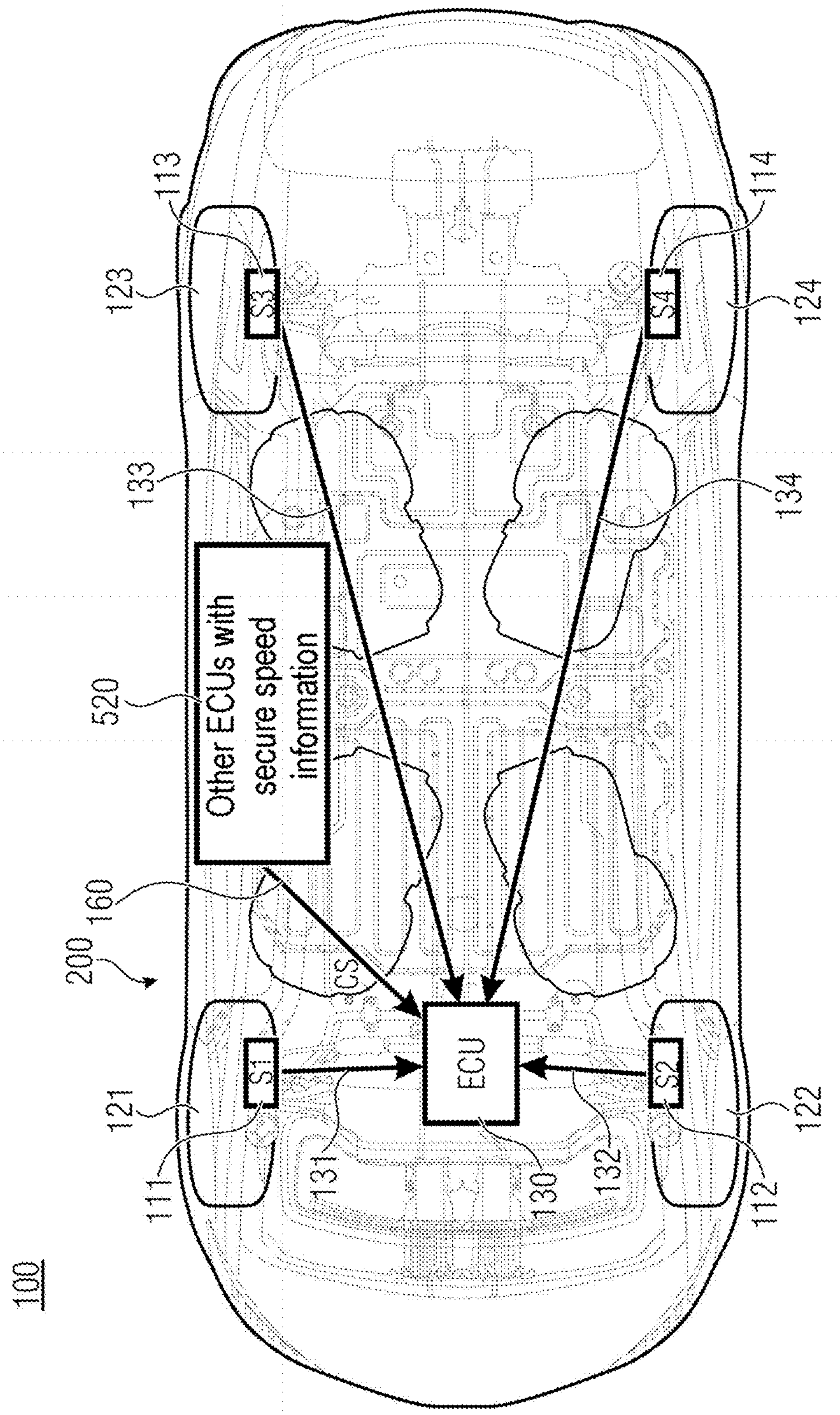
FIG. 6 illustrates a schematic semi-transparent top view of a vehicle with a driving safety system according to a further implementation.

FIG. 6 shows a further example implementation of an innovative analog stick 100. Here, the driving safety control unit 130 is configured to communicate with at least one second control unit 520 installed in the motor vehicle 200 via the safe transmission channel 160, such as CAN, Ethernet or FlexRay. In this case, the driving safety control unit 130 is configured to receive the movement signal in the form of a speed signal received via a different second safe transmission channel from this second control unit 520.

The decisive factor is that it is a "safe" speed signal, e.g., the second control unit 520 should have received the "safe" speed signal via a safe transmission channel. For example, the second control unit 520 may receive the "safe" speed signal from a speed sensor (not shown here), which transmits the speed signal via a safe external transmission channel (e.g., a bus line) to the second control unit 520. Alternatively or additionally, it would be conceivable that the second control unit 520 itself has implemented a speed sensor. In this case, the detected speed signal could be transmitted via a safe internal transmission channel (e.g., an internal or integrated data line) to the second control unit 520.

According to the innovative concept presented herein, a "unsafe" wheel speed signal received by one of the conventional wheel speed sensors 111, 112, 113, 114 can now be checked for plausibility using the "safe" speed signal. If necessary, the "unsafe" wheel speed signal can be converted into an "unsafe" speed signal, or the "safe" speed signal received from the second control unit 520 can be converted into a "safe" speed signal. The driving safety control unit 130 receives the "safe" speed signal via the safe transmission channel 160 from the second control unit 520.

Figure 7:
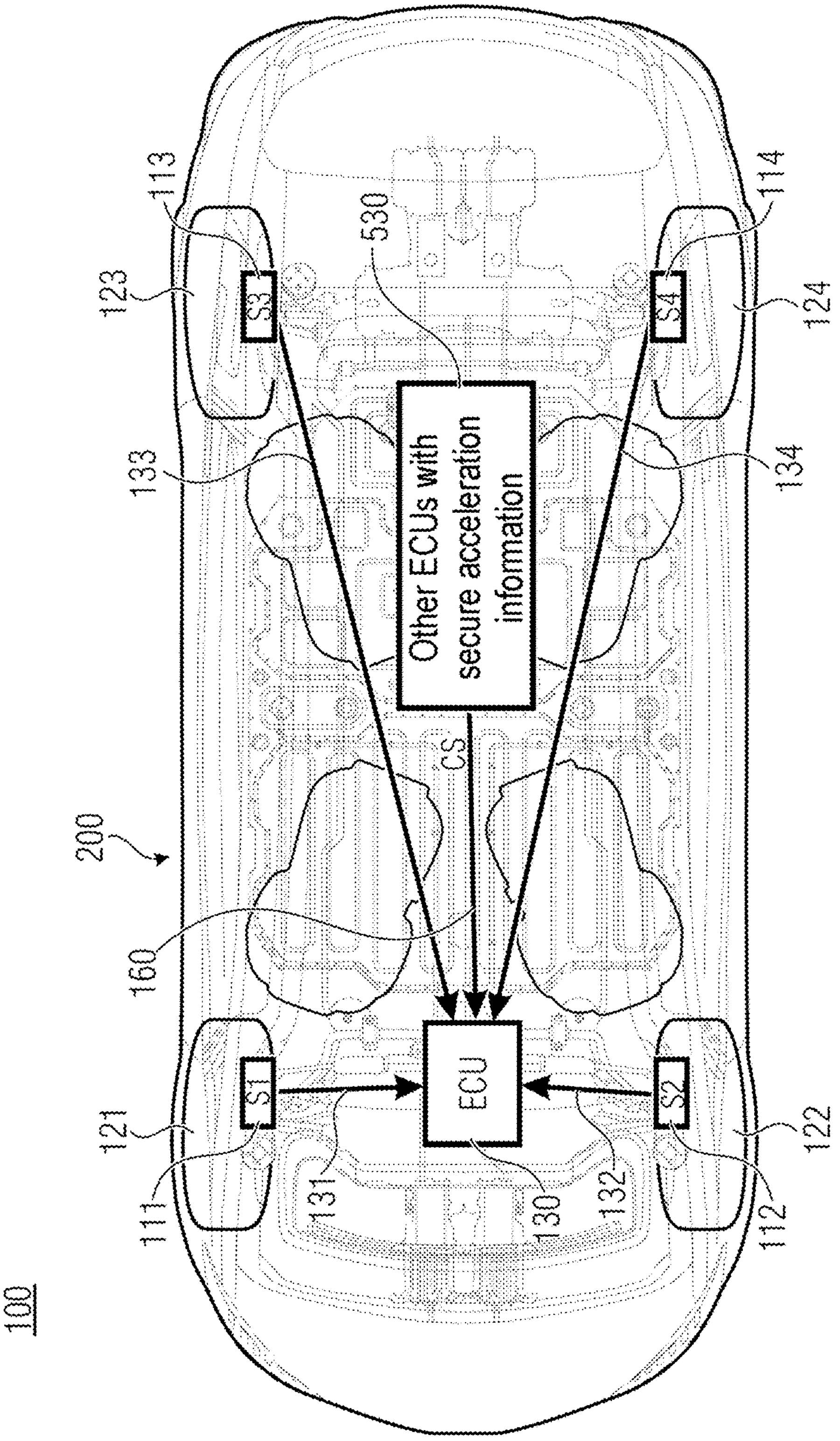
FIG. 7 illustrates a schematic semi-transparent top view of a vehicle with a driving safety system according to a further implementation.

FIG. 7 shows a further example implementation of an innovative analog stick 100. Here, the driving safety control unit 130 is configured to communicate with at least one second control unit 530 installed in the motor vehicle 200 via the safe transmission channel 160, such as CAN, Ethernet or FlexRay. Compared to FIG. 6, however, the driving safety control unit 130 receives a "safe" acceleration signal instead of the "safe" speed signal. Accordingly, the driving safety control unit 130 in this implementation is configured to receive the travel signal in the form of an acceleration signal received via a different second safe transmission channel from the second control unit 530.

Again, it is crucial that it is a "safe" acceleration signal, e.g., the second control unit 530 should have received the "safe" acceleration signal via a safe (internal and/or external) transmission channel.

For example, the second control unit 530 may be an airbag control unit with an integrated inertial measurement unit (IMU), which is configured to detect the actual acceleration of the motor vehicle 200 and output this as the "safe" acceleration signal.

According to the innovative concept presented herein, a "unsafe" wheel speed signal received by one of the conventional wheel speed sensors 111, 112, 113, 114 can now be checked for plausibility using the "safe" acceleration signal. If necessary, the "unsafe" wheel speed signal can be converted into an "unsafe" acceleration signal for this purpose, or the "safe" acceleration signal received from the second control unit 530 can be converted into a "safe" speed signal. The driving safety control unit 130 receives the "safe" acceleration signal via the safe transmission channel 160 from the second control unit 530.

In the with reference to FIGS. 5 to 7, implementations have been described in which the driving safety control unit 130 receives the "safe" locomotion signal from other control units 510, 520, 530. It would also be conceivable, however, that the driving safety control unit 130 receives a "safe" locomotion signal directly from a speed detection device (e.g., a wheel speed sensor), a speed detection device or an acceleration detection device, provided that the corresponding speed signal, speed signal or acceleration signal is transmitted in each case via a safe transmission channel 160 to the driving safety control unit 130. The corresponding speed detection device, speed detection device or acceleration detection device may be present as a separate device, e.g., externally from the driving safety control unit 130. However, it would also be conceivable that the corresponding speed detection device, speed detection device or acceleration detection device is integrated in the driving safety control unit 130.

In addition to the previously described wheel speed sensors, a speed detection device can also be configured, for example, in the form of a motor control sensor or a transmission sensor. Both can measure the engine or transmission speed, which in turn can be used to draw conclusions about wheel speed, vehicle speed and vehicle acceleration.

A speed detection device may be realized, for example, in the form of a GPS module, which transmits the "safe" locomotion signal in the form of a GPS-supported speed signal to the driving safety control unit 130.

One advantage of the innovative concept presented here is that the plausibility check is not time-critical compared to the driving safety applications (ABS, ESP ASR). If, for example, GPS reception is temporarily interrupted during a passage through a tunnel, the plausibility check can also be carried out after exiting the tunnel in order, for example, to detect a cyber attack and render it harmless. This means that an occasional comparison of the measured wheel speed with the "safe" wheel speed signal is sufficient to detect tampering.

However, a speed detection device can also be realized, for example, in the form of a camera or RADAR or LIDAR systems, which is equipped, for example, with an ego motion algorithm. In this case, the "safe" travel signal could be transmitted to the driving safety control unit 130 in the form of an ego motion signal representing the vehicle speed.

An acceleration detection device can be realized, for example, in the form of an acceleration sensor, such as an inertial measuring unit (IMU). In the vehicle, for example, there is the so-called inertial cluster in which the actual acceleration of the vehicle is recorded. This inertial cluster can be accessed by various functions or control units, such as the ABS, ESP, ASR or airbag control unit. The innovative driving safety control unit 130 could therefore be configured to obtain a "safe" acceleration signal from this inertial cluster via a safe transmission channel (e.g., CAN, Ethernet, FlexRay).

Figure 8:
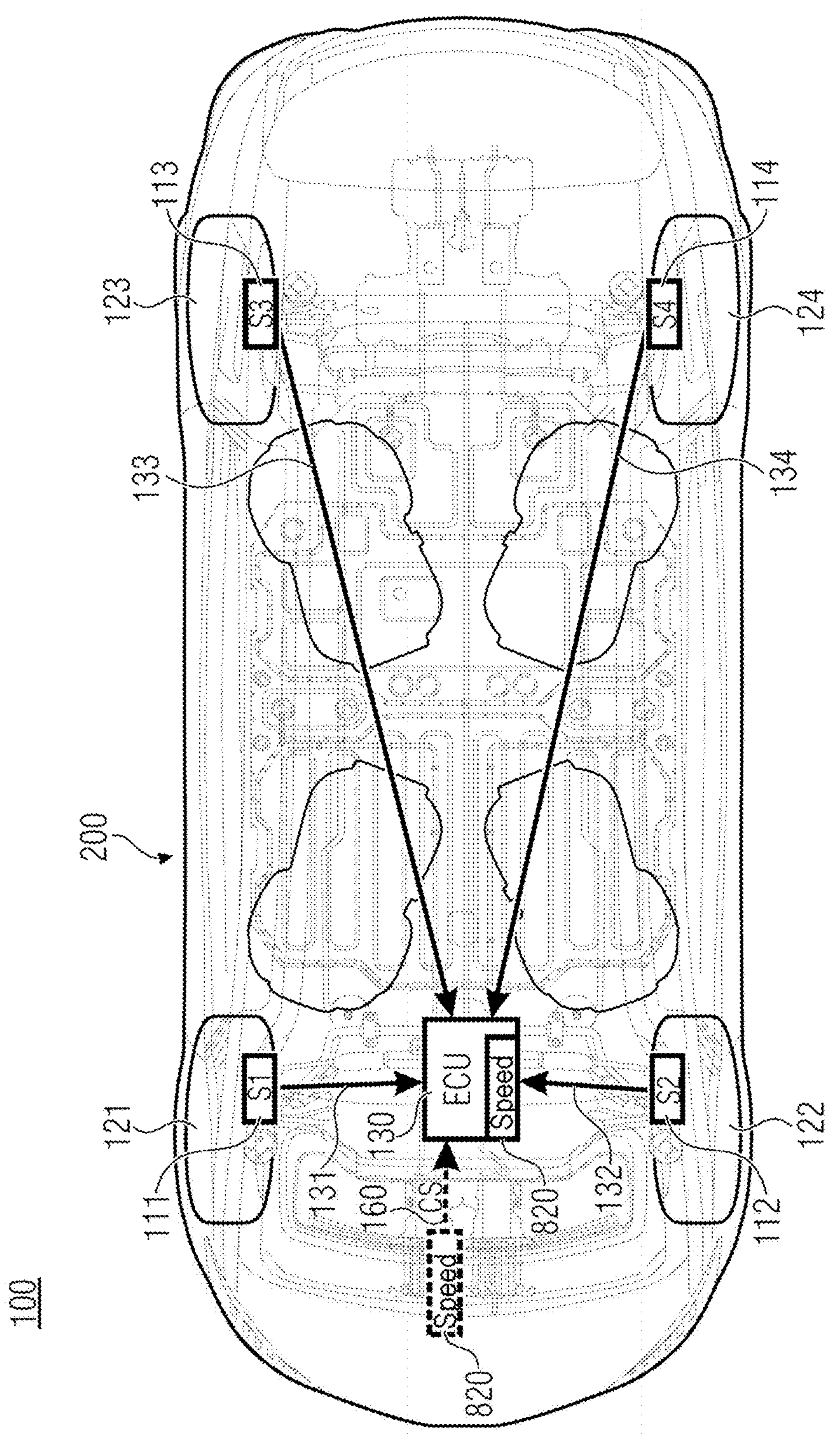
FIG. 8 illustrates a schematic semi-transparent top view of a vehicle with a driving safety system according to a further implementation.
Figure 9:
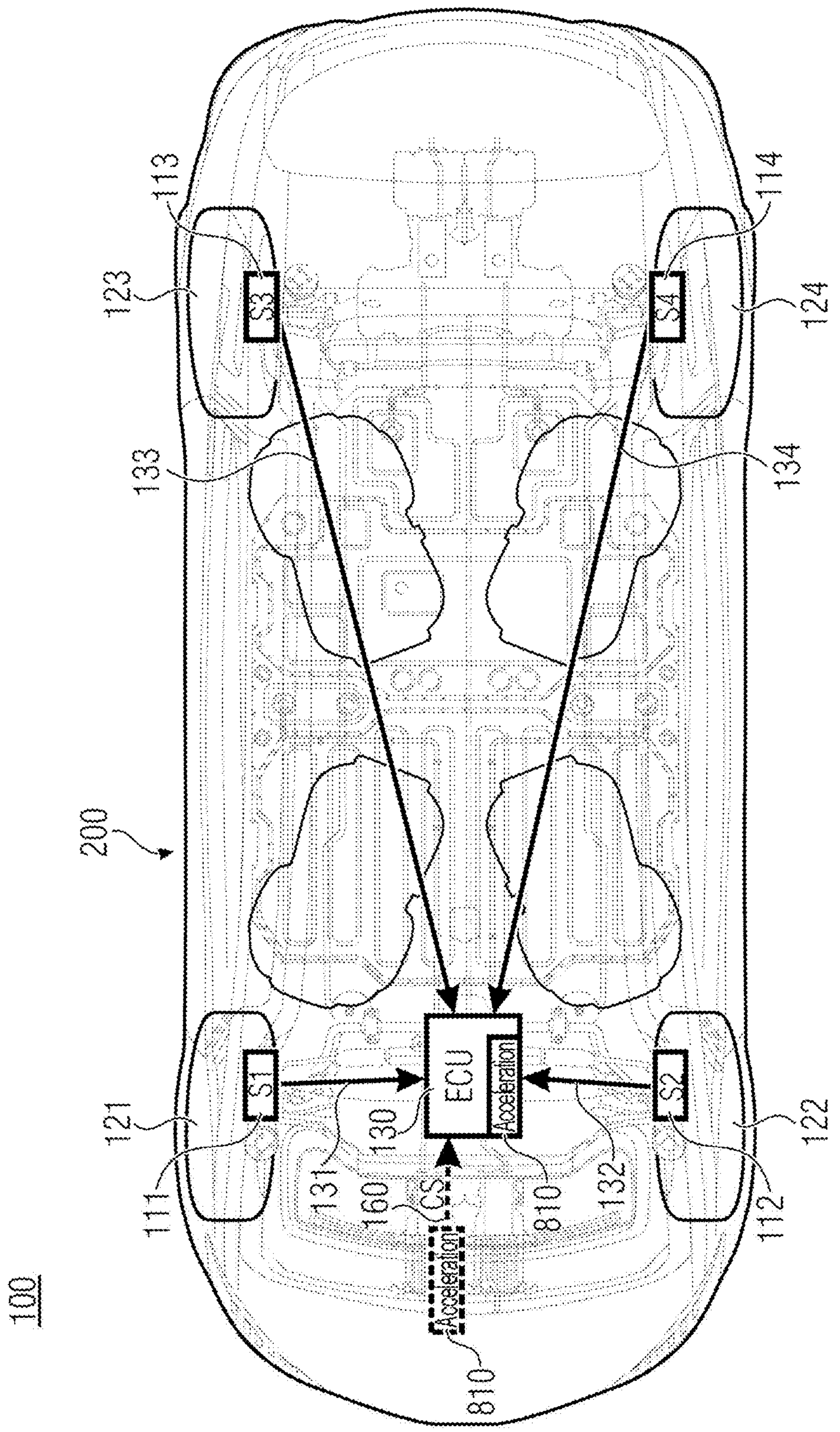
FIG. 9 illustrates a schematic semi-transparent top view of a vehicle with a driving safety system according to a further implementation.

The following FIGS. 8 and 9 show each implementation in which the driving safety control unit 130 receives the "safe" locomotion signal from a speed detection device (FIG. 8) or from an acceleration detection device (FIG. 9) respectively.

FIG. 8 shows a conceivable implementation in which the driving safety system 100 has a speed detection device 820 for measuring the actual speed of the vehicle 200. The speed detection device 820 can be integrated into the driving safety control unit 130 as shown in FIG. 8.

Alternatively, the speed detection device 820 could be configured externally from the driving safety control unit 130, for example in the form of an external ego motion camera, wherein the external speed detection device 820 is shown here in dashed lines.

However, the speed detection device 820 can also be, for example, a GPS module. An external speed detection device 820 may be configured, for example, in the form of an external GPS module, which is installed as part of a navigation system in the vehicle 200. An internal speed detection device 820, on the other hand, can be configured, for example, in the form of a GPS module, which is integrated in the driving safety control unit 130.

In the case of a (internal or external) GPS module 820, the driving safety control unit 130 may be configured in this implementation to receive the locomotion signal in the form of a "safe" speed signal generated by the GPS module 820 via the safe transmission channel 160.

Again, it is crucial that it is a "safe" speed signal, e.g., the driving safety control unit 130 receives the "safe" speed signal via a safe transmission channel 160 from the speed detection device 820. In the case of a speed detection device 820 integrated in the driving safety control unit 130, the safe transmission channel 160 may, for example, be a (not shown here) internal transmission channel, such as an internal or integrated data line. In the case of an external speed detection device 820, the secure transmission channel 160 may, for example, be an external data line which, for example, has authentication and/or encryption.

According to the innovative concept presented herein, a "unsafe" wheel speed signal received by one of the conventional wheel speed sensors 111, 112, 113, 114 can now be checked for plausibility using the "safe" speed signal. If necessary, the "unsafe" wheel speed signal can be converted into an "unsafe" speed signal for this purpose, or the "safe" speed signal received from the speed detection device 820 can be converted into a "safe" speed signal. The driving safety control unit 130 receives the "safe" speed signal via the safe transmission channel 160 directly from the speed detection device 820.

FIG. 9 shows a conceivable implementation in which the driving safety control unit 130 has an acceleration detection device 810 for measuring the actual acceleration of the vehicle 200. The acceleration detection device 810 may, for example, be an integrated inertial measurement unit (IMU). The acceleration detection device 810 can be integrated into the driving safety control unit 130 as shown in FIG. 9.

Alternatively, the acceleration detection device 810 could be configured externally from the driving safety control unit 130, for example in the form of an external IMU from the Inertia cluster, wherein the external acceleration detection device 810 is shown here in dashed lines.

Again, it is crucial that it is a "safe" acceleration signal, e.g., the driving safety control unit 130 should receive the "safe" acceleration signal from the acceleration detection device 810 via a safe transmission channel 160. In the case of an integrated in the driving safety control unit 130 acceleration detection device 810, the safe transmission channel 160 can be, for example, a (not shown here) internal transmission channel, such as an internal or integrated data line. In the case of an external acceleration detection device 810, the secure transmission channel 160 may, for example, be an external data line which, for example, has authentication and/or encryption.

However, it would also be conceivable that the acceleration detection device 810 a wheel speed signal or a speed signal is detected (or received) and this is converted into an acceleration signal using time differentiation (e.g., DV/dt).

According to the innovative concept presented herein, a "unsafe" wheel speed signal received by one of the conventional wheel speed sensors 111, 112, 113, 114 can now be checked for plausibility using the "safe" acceleration signal. If necessary, the "unsafe" wheel speed signal can be converted into an "unsafe" acceleration signal for this purpose, or the "safe" acceleration signal received from the acceleration detection device 810 can be converted into a "safe" speed signal. The driving safety control unit 130 receives the "safe" acceleration signal via the safe transmission channel 160 directly from the acceleration detection device 810.

In the previous implementations it has been described that the secure transmission channel 160 can be configured in the form of a physical data line. In all implementations, however, it is conceivable that the driving safety control unit 130 can be configured to transmit the "safe" movement signal wirelessly, e.g., via Bluetooth LE (LE: Low energy) or via a TPMS protocol (TPMS: Tire Pressure Monitoring System). In this case, the secure transmission channel 160 would be configured in the form of a secure radio transmission channel.

Figure 10:
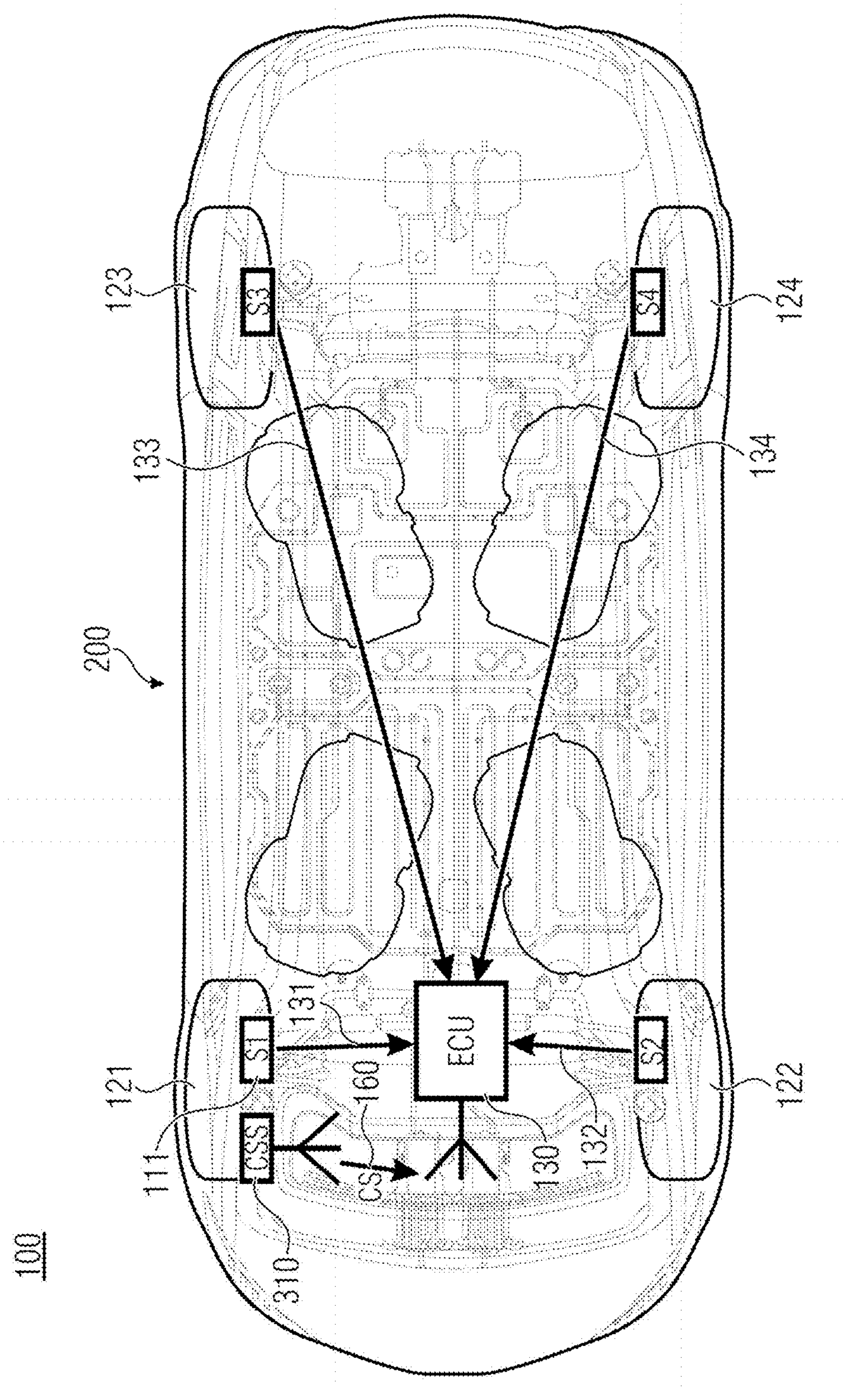
FIG. 10 illustrates a schematic semi-transparent top view of a vehicle having a driving safety system according to a further implementation.

FIG. 10 shows a corresponding non-limiting implementation in which an additional wheel speed sensor 310 communicates with the driving safety control unit 130 via a safe radio protocol and transmits the "safe" movement signal wirelessly to the driving safety control unit 130. This means that the safe transmission channel 160 would be configured in the form of a safe radio transmission channel. The use of such a secure radio transmission channel 160 would also be conceivable in principle in all other implementations, alternatively or in addition to the safe transmission channels 160 described therein, which were represented in the form of physical data lines.

Figure 11:
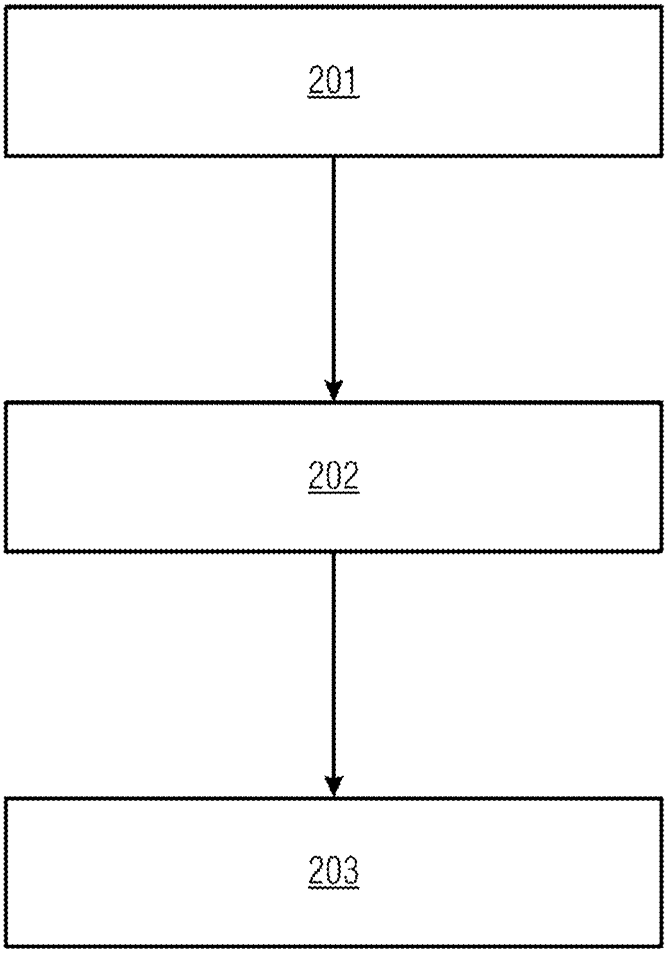
FIG. 11 illustrates a schematic block diagram for illustrating a method according to a further implementation.

Finally, FIG. 11 shows a schematic block diagram for the illustration of an innovative method for plausibility testing of a wheel speed signal received by a wheel speed sensor 111, 134, 132, 133 via an unsafe transmission channel 131, 113, 114, 112 in a driving safety system 100 for a motor vehicle 200.

In block 201, a wheel speed signal is first received from a wheel speed sensor 111, wherein the wheel speed signal represents the determined actual wheel speed, and wherein the wheel speed signal is transmitted via an unsecured transmission channel 131.

In block 202, a locomotion signal is received, which indicates the current actual speed of the vehicle 200, wherein the locomotion signal is transmitted via a safe transmission channel 160.

In block 203, the wheel speed signal received via the unsafe transmission channel 131 is then compared with the transport signal transmitted via the safe transmission channel 160 in order to check the plausibility of the "unsafe" wheel speed signal of the wheel speed sensor 111.

The above-described example implementations are merely an illustration of the principles of the innovative concept described herein. It is to be understood that modifications and variations of the arrangements and details described herein will be obvious to others skilled in the art. For this reason, the concept described herein is intended to be limited merely by the scope of protection of the following patent claims rather than by the specific details which have been presented herein based on the description and the explanation of the example implementations.

Although some aspects have been described in connection with an device, it is to be understood that these aspects also constitute a description of the corresponding method, with the result that a block or a structural element of a device should also be understood to be a corresponding method step or a feature of a method step. Analogously thereto, aspects which have been described in connection with a method step or as a method step also constitute a description of a corresponding block or detail or feature of a corresponding device.

Some or all of the method steps can be performed by a hardware apparatus (or using a hardware apparatus), such as a microprocessor, a programmable computer or an electronic circuit. In some example implementations, some or more of the most important method steps can be performed by such an apparatus.

Depending on the specific implementation requirements, example implementations can be implemented in hardware or software or at least partially in hardware or at least partially in software. The implementation can be performed using a digital storage medium, for example a floppy disk, a DVD, a Blu-ray disc, a CD, a ROM, a PROM, an EPROM, an EEPROM or a FLASH memory, a hard disk or another magnetic or optical memory, on which electronically readable control signals are stored that can interact or do interact with a programmable computer system such that the respective method is performed. For this reason, the digital storage medium can be computer readable.

Some example implementations thus comprise a data carrier which has electronically readable control signals that are capable of interacting with a programmable computer system such that one of the methods described here is performed.

In general, example implementations can be implemented as a computer program product having a program code, wherein the program code acts to perform a method if the computer program product is executed on a computer.

The program code can also be stored, for example, on a machine-readable carrier.

Other example implementations comprise the computer program for performing one of the methods described here, wherein the computer program is stored on a machine-readable carrier. In other words, an example implementation of the method according to the implementation is thus a computer program which has a program code for performing one of the methods described herein if the computer program is running on a computer.

A further example implementation of the method is thus a data carrier (or a digital storage medium or computer-readable medium), on which the computer program for performing one of the methods described here is recorded. The data carrier or the digital storage medium or the computer-readable medium are typically tangible and/or non-volatile.

A further example implementation of the method according to the implementation is thus a data stream or sequence of signals, which represents or represent the computer program for performing one of the methods described herein. The data stream or the sequence of signals can be configured for example so as to be transferred via a data communication connection, for example the Internet.

A further example implementation comprises a processing device, for example a computer or a programmable logic device, which is configured or adapted for performing one of the methods described herein.

A further example implementation comprises a computer, on which the computer program for performing one of the methods described herein is installed.

A further example implementation comprises an apparatus or system, which is configured to transmit a computer program for performing at least one of the methods described herein to a receiver. The transmission can be electronic or optical, for example. The receiver can be, for example, a computer, a mobile device, a storage device or a similar apparatus. The apparatus or the system can comprise, for example, a file server for transmitting the computer program to the receiver.

In some example implementations, a programmable logic device (for example a field programmable gate array, FPGA) can be used to perform some or all functions of the methods described here. In some example implementations, a field programmable gate array can act together with a microprocessor to perform one of the methods described herein. In general, the methods in some example implementations are performed by any desired hardware apparatus. The latter can be universally usable hardware, such as a computer processor (CPU) or hardware that is specific to the method, such as an ASIC.

What is claimed is:

1. A driving safety system for a motor vehicle, comprising:

a first wheel speed sensor configured to;
 determine an actual wheel speed on a wheel, and
 generate a wheel speed signal representing the actual wheel speed; and
a driving safety control unit configured to:
 receive the wheel speed signal via an unsecured transmission channel between the first wheel speed sensor and the driving safety control unit, receive, via a secure transmission channel, a locomotion signal that correlates with an actual vehicle speed, compare the locomotion signal with the wheel speed signal to check the wheel speed signal for plausibility, wherein the driving safety control unit, to compare the locomotion signal with the wheel speed signal, is configured to:

perform a setpoint-actual value comparison, wherein the locomotion signal represents a setpoint, and wherein the wheel speed signal represents an actual value; and generate an error message based on a detection of a deviation.

2. The driving safety system as claimed in claim 1, wherein the secure transmission channel comprises an authentication method for the locomotion signal.

3. The driving safety system as claimed in claim 1, wherein the secure transmission channel comprises an encryption of the locomotion signal.

4. The driving safety system as claimed in claim 1, wherein the secure transmission channel complies with requirements of an ISO/SAE 21434 standard for cyber security in vehicles.

5. The driving safety system as claimed in claim 1, wherein the driving safety control unit is configured to initiate a specific action based on the detection of the deviation.

6. The driving safety system as claimed in claim 1, wherein the wheel speed signal comprises a first wheel speed signal, the driving safety system further comprising:

a second wheel speed sensor, wherein the driving safety control unit is configured to receive a second wheel speed signal generated by the second wheel speed sensor via the secure transmission channel, and wherein the second wheel speed signal generated by the second wheel speed sensor corresponds to the locomotion signal.

7. The driving safety system as claimed in claim 6, further comprising:

a third wheel speed sensor associated with a specific wheel of the motor vehicle, wherein driving safety control unit is configured to:

receive a third wheel speed signal generated by the third wheel speed sensor; and compare the third wheel speed signal and the locomotion signal to check a wheel speed of the specific wheel for plausibility.

8. The driving safety system as claimed in claim 6, wherein the second wheel speed sensor is configured to transmit the locomotion signal wirelessly to the driving safety control unit.

9. The driving safety system as claimed in claim 6, wherein the driving safety control unit is configured to communicate with at least one second control unit installed in the motor vehicle via the secure transmission channel, wherein the at least one second control unit is configured to receive a third wheel speed signal from the second wheel speed sensor via a different secure transmission channel and to transmit the third wheel speed signal via the secure transmission channel to the driving safety control unit, and wherein the third wheel speed signal corresponds to the locomotion signal.

10. The driving safety system of claim 6, wherein the driving safety system is part of a two-circuit brake control system comprising, and wherein the two-circuit brake control system includes the second wheel speed sensor.

11. The driving safety system of claim 6, wherein the driving safety system is part of a four-circuit brake control system comprising, and wherein the four-circuit brake control system includes the second wheel speed sensor.

12. The driving safety system as claimed in claim 1, further comprising:

a GPS module, wherein the driving safety control unit is configured to receive a speed signal generated by the GPS module via the secure transmission channel, and wherein the speed signal generated by the GPS module corresponds to the locomotion signal.

13. The driving safety system as claimed in claim 1, wherein the driving safety control unit is configured to communicate with at least one second control unit installed in the motor vehicle via the secure transmission channel, and wherein the driving safety control unit is configured to receive, from the at least one second control unit and via a different secure transmission channel, a speed signal corresponding to the locomotion signal.

14. The driving safety system as claimed in claim 1, further comprising:

an acceleration sensor, wherein the driving safety control unit is configured to receive, via the secure transmission channel, an acceleration signal generated by the acceleration sensor, wherein the acceleration signal corresponds to the locomotion signal.

15. The driving safety system according to claim 1, wherein the driving safety control unit is configured to communicate with at least one second control unit installed in the motor vehicle via the secure transmission channel, and wherein the driving safety control unit is configured to receive from the at least one second control unit, and via a different secure transmission channel, an acceleration signal corresponding to the locomotion signal.

16. The driving safety system as claimed in claim 15, wherein the at least one second control unit is an airbag control unit with an integrated inertial measuring unit, which is configured to detect an acceleration of the motor vehicle, and wherein the acceleration signal indicates the acceleration of the motor vehicle.

17. A method for a plausibility check of a wheel speed signal received by a wheel speed sensor via an unsecured transmission channel in a driving safety system for a motor vehicle, wherein the method comprises:

receiving the wheel speed signal from the wheel speed sensor, wherein the wheel speed signal represents an actual wheel speed, and wherein the wheel speed signal is transmitted via the unsecured transmission channel;

receiving a locomotion signal that correlates with an actual vehicle speed, the locomotion signal being transmitted via a secure transmission channel; and comparing the wheel speed signal received via the unsecure transmission channel with the locomotion signal transmitted via the secure transmission channel to check the wheel speed signal for plausibility, wherein comparing the wheel speed signal with the locomotion signal comprises performing a setpoint-actual value comparison, wherein the locomotion signal represents a setpoint, and wherein the wheel speed signal represents an actual value; and generating an error message based on a detection of a deviation.

18. A non-transitory computer-readable medium storing a set of instructions, the set of instructions comprising:

one or more instructions that, when executed by a driving safety system, cause the driving safety system to:

receive a wheel speed signal from a wheel speed sensor, wherein the wheel speed signal represents an actual wheel speed, and wherein the wheel speed signal is transmitted via an unsecured transmission channel;

receive a locomotion signal that correlates with an actual vehicle speed, the locomotion signal being transmitted via a secure transmission channel; and compare the wheel speed signal received via the unsecure transmission channel with the locomotion signal transmitted via the secure transmission channel to check the wheel speed signal for plausibility, wherein the one or more instructions, to compare the wheel speed signal with the locomotion signal, cause the driving safety system to:

perform a setpoint-actual value comparison, wherein the locomotion signal represents a setpoint, and wherein the wheel speed signal represents an actual value; and generate an error message based on a detection of a deviation.

19. The non-transitory computer-readable medium as claimed in claim 18, wherein the secure transmission channel comprises an authentication method for the locomotion signal.

20. The non-transitory computer-readable medium as claimed in claim 18, wherein the secure transmission channel comprises an encryption of the locomotion signal.

* * * * *